United States Patent
Lenchner et al.

(10) Patent No.: US 11,005,790 B2
(45) Date of Patent: May 11, 2021

(54) ENABLING ATTENTION BY LEVERAGING A USER-EFFECTIVE COMMUNICATION CHANNEL

(71) Applicant: International Business Machines Corporation, Armonk, NY (US)

(72) Inventors: Jonathan Lenchner, Nairobi (KE); Shikhar Kwatra, Durham, NC (US); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 16/400,018

(22) Filed: Apr. 30, 2019

(65) Prior Publication Data

US 2020/0351225 A1 Nov. 5, 2020

(51) Int. Cl.
*G06F 40/30* (2020.01)
*G06F 40/211* (2020.01)
(Continued)

(52) U.S. Cl.
CPC ............ *H04L 51/046* (2013.01); *G06F 9/542* (2013.01); *G06F 40/211* (2020.01);
(Continued)

(58) Field of Classification Search
CPC ......... H04L 51/00; H04L 51/02; H04L 51/04; H04L 51/043; H04L 51/046; H04L 51/10; H04L 51/12; H04L 51/16; G06N 3/02; G06N 3/04; G06N 3/06; G06N 3/08; G06N 3/082; G06N 3/084; G06N 3/086; G06N 3/088; G06N 3/10; G06N 3/12; G06N 20/00; G06N 20/10; G06N 20/20;
(Continued)

(56) References Cited

U.S. PATENT DOCUMENTS 4,595,990 A * 6/1986 Garwin ................. A61B 3/113
708/141
6,542,889 B1 4/2003 Aggarwal et al.
(Continued)

OTHER PUBLICATIONS

Anna Huang, "Similarity Measures for Text Document Clustering," NZCSRSC 2008, Apr. 2008, Christchurch, New Zealand. p. 49-56.
(Continued)

*Primary Examiner* — Leshui Zhang
(74) *Attorney, Agent, or Firm* — Shimon Benjamin; Otterstedt, Wallace & Kammer, LLP (57) ABSTRACT

An exemplary apparatus includes a memory embodying computer executable instructions and at least one processor, coupled to the memory, and operative by the computer executable instructions to facilitate a method. The method includes tracking a topic and a context of an electronic conversation in a first communication channel by using a machine learning method to process the electronic conversation; identifying confusion in a participant of the electronic conversation regarding a change in the topic or the context; identifying a user-effective communication channel for alerting the participant to the change in the topic or the context; and alerting the participant of the change in the topic or the context via the user-effective communication channel.

19 Claims, 5 Drawing Sheets

(51) Int. Cl.
  *G06F 9/54* (2006.01)
  *G06N 20/00* (2019.01)
  *H04L 12/58* (2006.01)
  *G06N 3/08* (2006.01)
  *G06F 40/216* (2020.01)

(52) U.S. Cl.
  CPC ............ *G06F 40/216* (2020.01); *G06F 40/30* (2020.01); *G06N 3/08* (2013.01); *G06N 20/00* (2019.01)

(58) Field of Classification Search
  CPC .... G06F 40/205; G06F 40/211; G06F 40/216; G06F 40/221; G06F 40/226; G06F 40/232; G06F 40/237; G06F 40/268; G06F 40/279; G06F 40/284; G06F 40/289; G06F 40/295; G06F 40/30; G06F 40/35; G06F 9/54; G06F 9/542; G06F 9/543; G06F 9/544; G06F 9/545; G06F 9/546
  USPC ........................................................ 704/1–9
  See application file for complete search history.

(56) References Cited

U.S. PATENT DOCUMENTS

| | | |
|---|---|---|
| 8,095,595 B2 | 1/2012 | Bobbitt et al. |
| 8,626,832 B2 | 1/2014 | Kieran et al. |
| 8,706,725 B2 | 4/2014 | Bailey et al. |
| 8,825,511 B2 | 9/2014 | Hamilton et al. |
| 8,849,356 B2 | 9/2014 | Chi et al. |
| 8,938,463 B1 | 1/2015 | Kim et al. |
| 9,135,320 B2 | 9/2015 | Goyal et al. |
| 9,292,597 B2 | 3/2016 | Luo et al. |
| 10,051,109 B2 | 8/2018 | Jackson et al. |
| 2009/0043860 A1 | 2/2009 | Aoki et al. |
| 2010/0317371 A1 | 12/2010 | Westerinen et al. |
| 2012/0023113 A1* | 1/2012 | Ferren ................. G06F 16/9535 707/751 |
| 2012/0124147 A1 | 5/2012 | Hamlin et al. |
| 2013/0328665 A1 | 12/2013 | Cranfill et al. |
| 2014/0122626 A1 | 5/2014 | Alam |
| 2014/0380489 A1 | 12/2014 | Hacid et al. |
| 2015/0088574 A1 | 3/2015 | Libin et al. |
| 2017/0038933 A1 | 2/2017 | Hoskins et al. |
| 2017/0116337 A1 | 4/2017 | Creamer et al. |
| 2017/0243171 A1* | 8/2017 | Bellamy ............ G06Q 10/1095 |
| 2018/0260680 A1* | 9/2018 | Finkelstein ............ G06N 3/006 |

OTHER PUBLICATIONS

Peter Mell et al., "The NIST Definition of Cloud Computing". Special Publication 800-145. NIST. Sep. 2011, pp. 1-7.
John E. Kelly III, "Computing, cognition, and the future of knowing", IBM Corp. Oct. 2015. pp. 1-7.
Wei Peng et al., "Mining the 'Voice of the Customer' for Business Prioritization," ACM Transactions on Intelligent Systems and Technology vol. 3(2), Feb. 2012, Article 38 pp. 1-17.
Harrison, Alan, "List of IBM Patents or Patent Applications Treated as Related", Apr. 2019, pp. 1-2.

\* cited by examiner

ENABLING ATTENTION BY LEVERAGING A USER-EFFECTIVE COMMUNICATION CHANNEL

BACKGROUND

The present invention relates to the electrical, electronic, and computer arts, and more specifically, to electronic conversations.

Frequently, a single person will be a participant in multiple electronic conversations and the person's attention will be divided among the various conversations. In such a circumstance it can happen that the participant will miss a change in the topic or context of one of the multiple electronic conversations. For example, a conversation about fixing bugs in computer code can abruptly shift to a discussion of sales figures related to the code that is being debugged. A participant who is engaged in other electronic conversations, additional to the bug fixing conversation, may miss the change in topic and be confused by subsequent questions about the sales figures.

SUMMARY

Principles of the invention provide techniques for enabling attention by leveraging a user-effective communication channel. In one aspect, an exemplary method includes tracking a topic and a context of an electronic conversation in a first communication channel by using a machine learning method to process the electronic conversation; identifying confusion in a participant of the electronic conversation regarding a change in the topic or the context; identifying a user-effective communication channel for alerting the participant to the change in the topic or the context; and alerting the participant of the change in the topic or the context via the user-effective communication channel.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory that embodies computer executable instructions, and at least one processor that is coupled to the memory and operative by the instructions to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

In view of the foregoing, techniques of the present invention can provide substantial beneficial technical effects. For example, one or more embodiments provide one or more of:

identifying divergence of an electronic conversation topic from a primary topic of discussion between users;

determining, based on contextual factors, that a change of the conversation topic has been unattended, unanswered, not responded to, or left untouched by a participant in the conversation;

learning the importance or relevance of the discussion to a participant by measuring the time sensitiveness of the discussion;

learning one or more attention resumption triggers;

prompting a user computing or communication device using a follow-up alerting function; or learning an effective position or coordinate on a graphical user interface (GUI) by detecting a user's focus of attention (FOA) on GUI.

These and other features and advantages of the present invention will become apparent from the following detailed description of illustrative embodiments thereof, which is to be read in connection with the accompanying drawings.

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
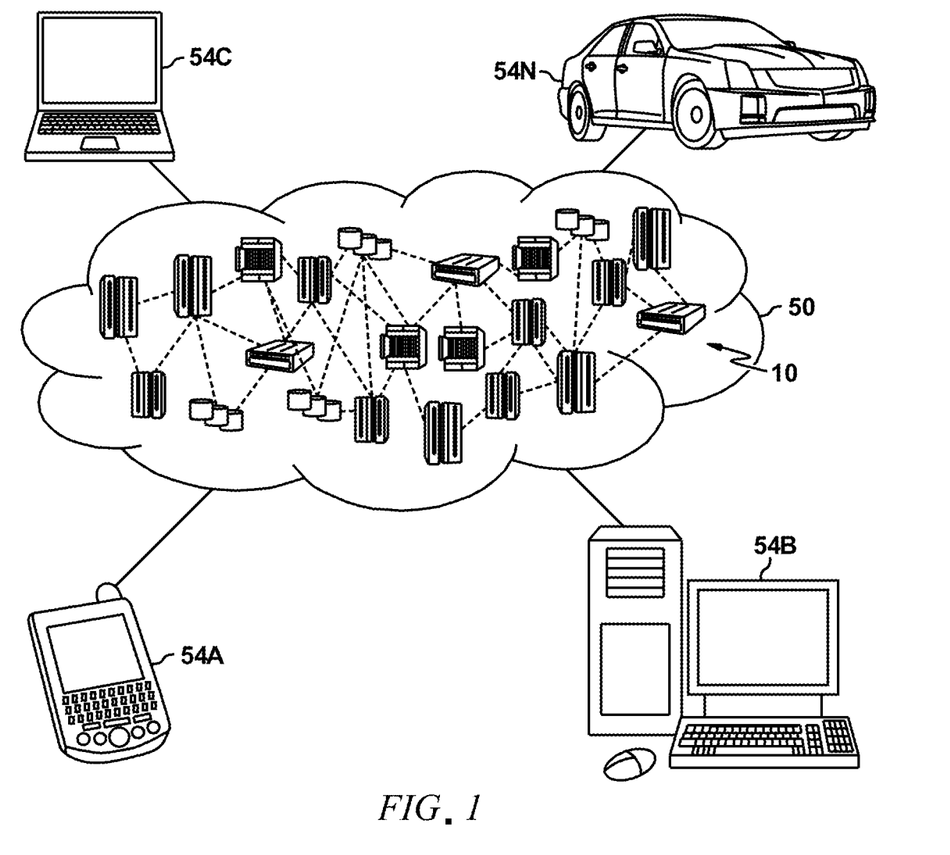
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
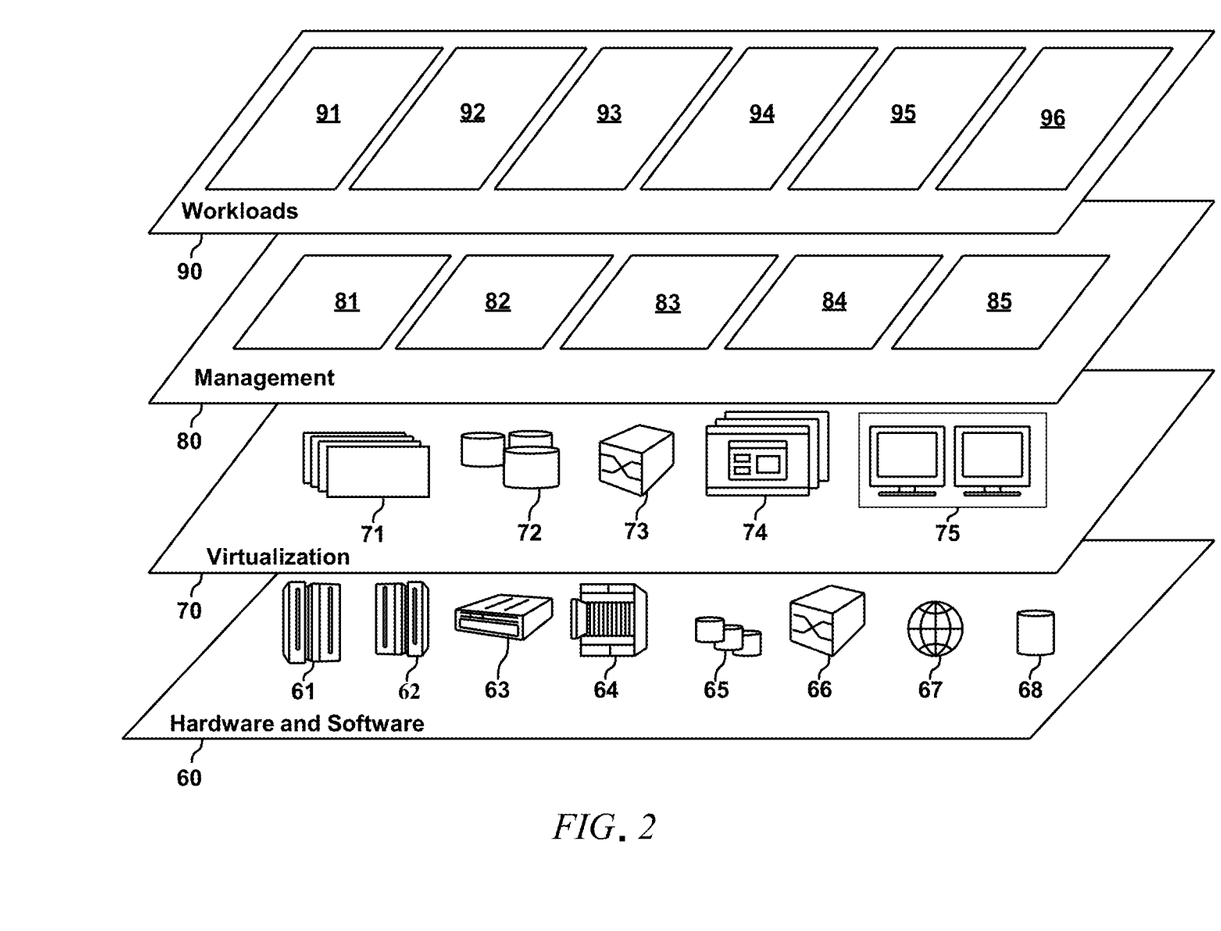
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cognitive attention enabler 96 for communicating with a conversation participant via a user-effective communication channel, in order to alert the participant to conversation content or context that the participant appears to have missed.

In one or more embodiments of the cognitive attention enabler 96, a multi-layer deep stacked neural network 300 (depicted in FIG. 3) implements a method 400 (depicted in FIG. 4) for priority analysis and alerting, in order to identify a change in the topic or context of a conversation and determine a degree of risk associated with a conversation participant missing the change, then alert the participant of the change.

Generally, a neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A neural network can implement supervised, unsupervised, or semi-supervised machine learning.

Figure 3:
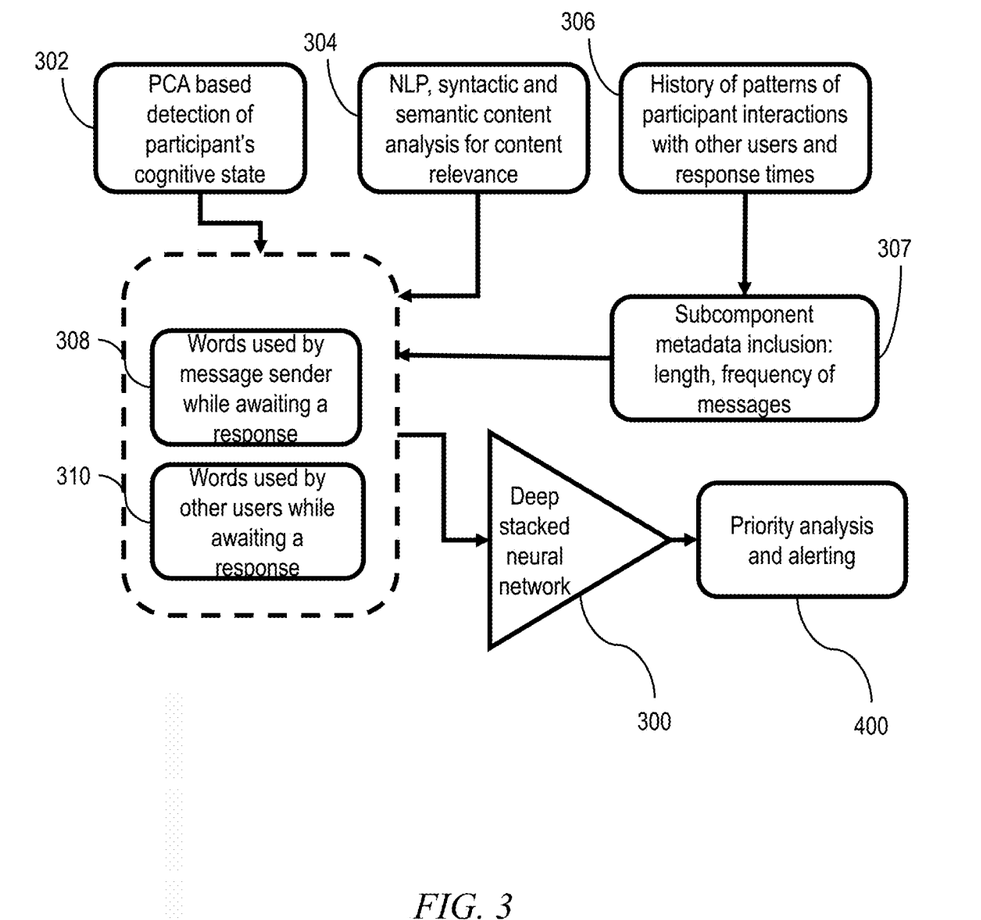
FIG. 3 depicts a neural network configuration appropriate for implementing an exemplary embodiment.

In one or more embodiments, as shown in FIG. 3, the neural network 300 takes into account at least the following input parameters:

(i). Participant's cognitive state 302 is determined using principal component analysis (PCA) for dimensionality reduction and for checking the attention while reading through the emails or messages to determine a probability if the participant would like to follow up on a conversation.

(ii). Content Relevance 304 enables the system to set the priority of the particular unanswered message for a specific participant based on their schedule and agenda under discussion. Content relevance involves natural language processing (NLP) (e.g., semantic content analysis) in order to determine the topic of a conversation based on textual or oral statements.

(iii). Previous pattern history 306 helps in determining the participant's interaction history with respective users and in determining the priority and alert timings to be configured based on the participant's schedule. The participant's schedule can be fetched from Internet of Things (IoT) sensor feeds including monitoring sources which detect visual context of the participant's activity via region-based convolutional neural network (R-CNN) and which detect calendar schedule by existing activity trackers on computing systems. This involves cadence (i.e., does the person typically expect a response if they have typed two or three messages in a row?), length of a message (short messages may be less likely to warrant a response than long ones). The previous pattern history 306 is output via long short-term memory (LSTM) model for text recognition and analysis.

Thus, in one implementation, latent Dirichlet analysis (LDA) form of natural language processing (NLP) is used to extract topics from the text conversation. The LSTM model has inputs corresponding to a specific user with the user's profile information and previous interaction history with different users/cohorts. Using the interaction history, context understanding (user activity via recurrent convolutional neural network (RCNN)) is obtained and stored in a buffer database in real time, via stacked LSTM network in order to derive next context/information pieces.

(iv). Subcomponent metadata inclusion 307: e.g., length, frequency of messages from sender to participant or other receivers.

(v). Words 308 that are used by other users when they are expecting a response from the participant (based on frequency and timing of response to such items).

(vi). Words 310 that are used by the participant when he or she is expecting a response from someone else.

Figure 4:
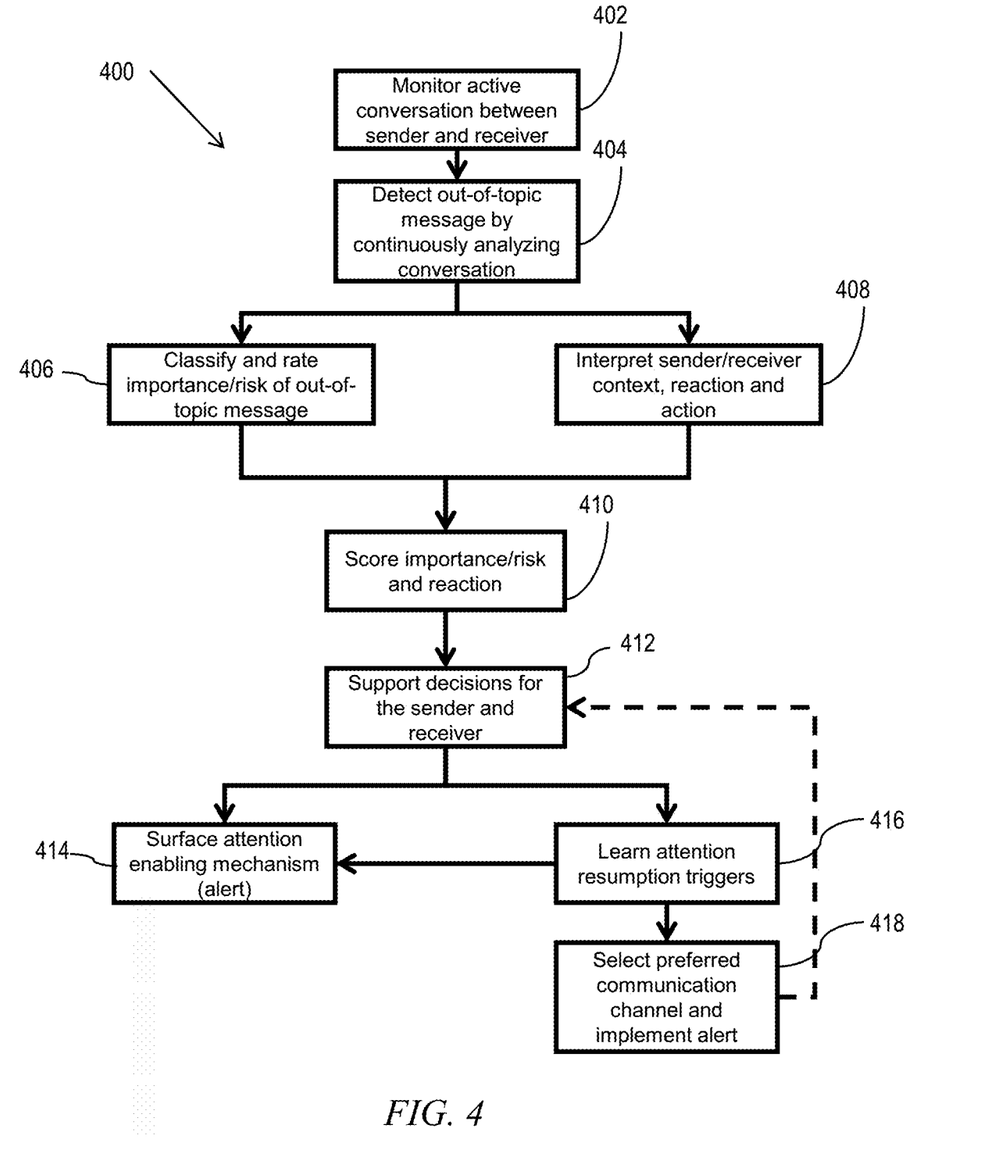
FIG. 4 depicts a method implemented by the neural network of FIG. 3.

Once these are learned the neural network 300 can identify, with certain confidence level or confidence factor, when a participant has not responded to a certain thread/comment/post or topic that the participant was expected to respond to, and can alert the participant accordingly (refer to block/method 400 discussed below).

The above system can thus be used in configuring a frequency of contacting, or in other words, the priority for a participant to respond to an unanswered query or concern expressed by another user or group. For instance, if User A and User B have an ongoing conversation thread and User A missed responding to a topic that was introduced while discussing a previous topic, the system can notify User A in the form of pop-up or alternate UI component like text highlight, pointer enablement etc. so that User A can respond to those unanswered comments/questions/posts/queries/concerns.

In one or more embodiments, a participant will be alerted more frequently and with higher priority when a manager is waiting for a response compared to a friend waiting for a response.

In one or more embodiments, the system may communicate with a participant's Digital Assistant device (Google Home™, Cortana®, Siri®, Alexa®, etc.) and feed to the device a timer and content information so that at an appropriate time the device can notify the participant to respond to a specific message. GOOGLE HOME is an unregistered trademark of Google LLC of Mountain View, Calif. CORTANA is a registered trademark of Microsoft Corporation of Redmond, Wash. SIRI is a registered trademark of Apple, Inc. of Cupertino, Calif. ALEXA is a registered trademark of Amazon Technologies, Inc. of Seattle, Wash.

For example, when a participant's manager posts a message that includes a question about the participant's job responsibilities, this immediately starts a high priority timer for the participant to respond. When the high priority timer expires, the system immediately alerts the participant to the manager's question and the need to promptly respond. On the other hand, when a participant's friend posts a message that generally inquires how the participant is feeling, this sets a normal priority timer to begin running when the participant's schedule indicates that he or she is "not busy." When the normal priority timer expires, the system alerts the participant to the friend's question the next time that the participant is not busy. Alternatively, the normal priority timer runs only when the participant is not busy.

In one or more embodiments, metadata information that pertains to a message and is useful for making a decision on the priority of alerting a participant may include the following: [User(s) engaged, Message topic, Mode of communication (email, IM etc.), Receive Time, User(s') contextual state(s)]. These parameters are stored for every conversation and stacked in each participant's cloud database for future referencing.

In one or more embodiments, the system also proposes a timer based interactive approach to inform a sender and receivers if a specific query hasn't been attended to promptly by the receivers.

In one or more embodiments, the system also learns an effective position or coordinate on a graphical user interface or device to display the notification/alert for the participant in order to seek the participant attention. In one or more embodiments, the method of learning the effective position or coordinate on a graphical user interface (GUI) is based on detecting the participant's focus of attention (FOA) on GUI. As the participant FOA moves from location/coordinate to location/coordinate, the system executes a model of likely user attentiveness level, based on text and content analytics of the information displayed at the participant's current FOA, and a model of content importance.

Thus, as depicted in FIG. 4, the neural network 300 implements a method 400. At 402, the neural network 300 monitors an active conversation between one or more senders and one or more receivers (including a participant for whose benefit the neural network operates). At 404, the neural network detects an out-of-topic message by continuously analyzing the conversation, e.g., using semantic content analysis or other natural language processing. At 406, the neural network classifies and rates importance/risk of the out-of-topic message, e.g., using semantic content analysis or other natural language processing. At 408, the neural network interprets sender/receiver context, reaction, and action. Steps 406, 408 can be performed in parallel or in sequence. In one or more embodiments, both steps are performed in order to gather significant contextual information not just pertaining to message content but also to the reactions of one or more participants in the conversation. At 410, the neural network scores the classified and rated importance/risk associated with the out-of-topic message and the interpreted reaction of the participant generally as discussed above. At 412, the neural network classifier outputs a choice of action that needs to be taken by the cognitive attention enabler 96 (shown in FIG. 1), based on the type of communication, the participant's context, etc. Multi-level classifier output as part of the neural network model is able to select an output choice from a vector of possible choices where each row number in the output vector corresponds to a type of action based on changes in the input parameters. Thus, the neural network 300 (shown in FIG. 3) supports decisions for the sender and receiver. At 414, the neural network surfaces an attention enabling mechanism (alert) based on step 416, where the neural network learns attention resumption triggers, i.e. what is the best way to obtain the participant's attention (e.g., pop-up, audio message, etc.). At 418, the neural network selects the participant's preferred communication channel, based on a history of monitored conversations, and implements the alert via the preferred (user-effective) communication channel. A user-effective communication channel can be identified by various methods. One method, according to one or more embodiments, is to track the participant's activity across a multi-vendor spectrum of communication channels. Optionally, the participant's FOA can be tracked across a GUI by which the participant interacts with the various communication channels. As some non-limiting examples, FOA can be tracked using a camera to detect eye movements, using cursor monitoring to detect cursor movements, or using active window monitoring to detect the current active window.

One or more embodiments relate to bringing to the attention of a participant in an active electronic conversation (e.g., SLACK® collaboration hub software discussion, WhatsApp®, social media post) a change in the topic or context of the conversation, thereby enabling the participant to appropriately act on portions of the conversation that are addressed to the participant by a sender entity based on importance level of the sender entity and of the electronic conversation and based on an analysis of desired position/location on graphical user interface or display on the electronic conversation app (e.g., SLACK® collaboration hub software discussion, WhatsApp®, social media post such as Facebook® post) and/or the participant's preferred, communication channel. FACEBOOK® and WHATSAPP® are registered trademarks of Facebook, Inc. of Menlo Park, Calif. SLACK® is a registered trademark of Slack Technologies, Inc. of San Francisco, Calif.

Accordingly, one or more embodiments assist the participant in keeping track of different topics being discussed by dynamically reverting or pointing to the topics that might have been unanswered, not responded to, or left untouched by the participant, based on learning the importance or relevance of those topics while engaged in a series of discussions or back and forth. One or more embodiments consider the frequency and appropriate timing for notifying/alerting the participant, which is based on a threshold computed by a conglomeration of priority of a message sender (e.g., a manager has higher priority, compared to a message from a friend) and priority of a message content (type of message to determine the relevance or importance of the content). One or more embodiments consider the relative position or coordinate to display the notification/alert to the participant, which is based on analyzing the most effective position or coordinate on the display to seek the participant attention coupled with analysis of priority of a message sender (e.g., a manager has higher priority, compared to a message from a friend) and priority of a message content (type of message to determine the relevance or importance of the content). In one or more embodiments, the threshold is based on a scale of 1-5 (5 being the highest priority). Of course, other scales could be used in other embodiments.

One or more embodiments create a trans-vendor "feed" for delivering to a conversation participant any of a variety of communications from a particular source. According to such embodiments, "following" the feed may be accomplished by installing an app that allows a sender to be sure that the participant is attuned at the app level to all communications. In one or more embodiments, the app may be configured to insert messages into various communication channels that the participant uses. For example, the app may be configured by the participant with permissions to read and to insert posts or private messages into one or more of a participant's electronic conversation apps (e.g., FACEBOOK®, SLACK®, or WHATSAPP®).

Of course, in most embodiments, various parties have opted-in for use of the system. In some cases, a degree of monitoring may have a sensitivity associated with it. In such cases, an option exists in which the method of aggregating messages from a plurality of message/communication apps (e.g., emails, tweets, SMS, etc.) installed on a participant's devices further includes ensuring some kind of privacy/confidentiality of the messages or data addressed to or sent by the participant. Various data anonymization and checkpoint techniques, as known in the art, can be plugged in as needed.

In one or more embodiments, a system may determine a risk level R for the participant ignoring the change in topic or context of the conversation, and this risk may be based on an analysis of the message sender, topic of message, a participant's calendar (e.g., the participant just had, or soon will be having, an interview for a job at the sender's company), etc. This method of determining the risk level R may further employ a plurality of machine learning models such as natural language processing, semantic content analysis, latent probabilistic semantic analysis, principal component analysis, topic extraction, keyword extraction, etc.

If desired, a server system may register one or more attention seekers' requests (e.g., a manager trying to get an employee to respond) and rank the requests according to statistics of received votes or bids and personal interest of the participant. The system generates one or more alerts for the participant related to requests of higher ranks. In one or more embodiments, if the risk level of missing a message is deemed to be too high, the system may further determine if the participant is presently active in one or more online environments, e.g. participant engagement in social networking activities (e.g., using TWITTER®, FACEBOOK®, WHATSAPP®, etc.). TWITTER® is a registered trademark of Twitter, Inc. of San Francisco, Calif. Based on the determination of the participant engagement with online activities, the system may generate an instant message by using the communicator's original message and privately display/post to the participant on a social network to seek participant attention; wherein the message generator displays context-specific phrases for the participant to act on it and may use one or more information summarization techniques.

In another embodiment, the system may trigger an embedded conversational AI agent such as a chatbot (e.g., in FACEBOOK, TWITTER®) by passing to the AI agent the content of a message and a degree of risk associated with missing the content. The AI agent then may initiate an alert to the participant based on the content of the message. In one or more embodiments, the AI agent may use the risk level to determine the modality of the alert (e.g., text, voice). For example, the system can initiate an automated phone call with the participant, in which a text-to-speech technique can be employed to translate the context of the communicator text message to a voice message.

For the purpose of efficient and useful aggregation, the system may encode various formats of contents to a single format and thereby manage the contents and may transform the contents to a format corresponding to a request of a third party or an end user. A media mediator system of managing various formats of contents may include: a service manager to receive a content and metadata of the content from a content provider; a metadata manager to register the content using the metadata, and to store the metadata of the registered content; a database manager to store and manage information associated with the content; and an encoding manager to schedule an encoding sequence of the content, and to sequentially encode the content based on a scheduling result.

In one or more embodiments, the cognitive attention enabler (AI agent) and risk level determination are triggered by inferring the time sensitiveness of a message using natural language processing (e.g., semantic content analysis) on the content and context of the communication sent (e.g., "Hi, Please sign and return the attached documents before noon," sent by a person identified as an attorney who has been working with the recipient), and by also analyzing attached document(s), if they exist, using natural language processing, deep-learning, etc.

In one or more embodiments, the system further allows a sender of communications to interact with an app on the participant's device in non-traditional ways. For example, if a virtual "hiring assistant" is provided by a prospective employer as an app for an applicant to install on his or her device, the "hiring assistant" may be parameterized remotely by the sender of communications, such as a hiring manager, or an HR representative. In this way, a message can be followed up with an "alerting level" that allows the virtual assistant to provide more emphatic alerts about an important email, or to interact and engage the participant more about content of an important social network post, tweet, etc.

As one example of the operation of a "follow-up alerting function," a hiring manager sends a formal email to a candidate asking for two letters of reference. Absent a response, the manager then two days later parameterizes the hiring assistant on the candidate's device with the phrase "Please have a look at the prospective employer's email waiting for you. The process is moving forward, but you need to provide more information in order to be considered." In this way, a virtual third party can act as a conduit for incidental and persuasive contextual messages that are best not sent by the manager himself or herself. This allows communication to be personalized and one to one, but with a virtual mediator adding the contextual cues and information about the meaning of the email "behind the scenes" to be shared with the candidate in the form of an alert. Having a virtual third person involved makes it less clear which person at the potential employer is providing the context.

Given the discussion thus far, and with reference to the accompanying drawings, it will be appreciated that, in general terms, an exemplary method, according to an aspect of the invention, includes at 402 tracking a topic and a context of an electronic conversation in a first communication channel by using a machine learning method to process the electronic conversation; at 404, 408 identifying confusion in a participant of the electronic conversation regarding a change in the topic or the context; at 418 identifying a user-effective communication channel for alerting the participant to the change in the topic or the context; and at 414 alerting the participant of the change in the topic or the context via the user-effective communication channel.

In one or more embodiments the method also includes at 416 learning an effective position or coordinate on a graphical user interface to display a notification for alerting the participant. In one or more embodiments, learning the effective position or coordinate includes detecting the participant's focus of attention on the graphical user interface.

In one or more embodiments the method also includes updating a model of participant attentiveness based on text analytics of information displayed at the participant's current focus of attention.

In one or more embodiments, identifying confusion includes using the machine learning method to process the participant's contributions to the electronic conversation. In one or more embodiments, identifying confusion includes using the machine learning method to measure an elapsed time since the change in the topic or the context. In one or more embodiments, identifying confusion includes using the machine learning method to count a number of communications, relevant to the change in the topic or the context, that have not been answered by the participant.

In one or more embodiments, identifying a user-effective communication channel includes tracking the participant's activity across a multi-vendor spectrum of communication channels.

In one or more embodiments, alerting the participant includes propagating to the participant a summary of the change in the topic or the context via a communication channel in which the participant is currently active. In one or more embodiments, alerting the participant includes propagating to the participant a summary of the change in the topic or the context via a communication channel in which the participant is most often active. In one or more embodiments, alerting the participant includes at least one of: triggering a message pop-up, scrolling text on the participant's current device, encircling a statement indicating the change in the topic or the context, moving a mouse pointer to indicate the change in the topic or the context, generating a voice message, or activating the participant's digital assistant. In one or more embodiments, alerting the participant includes selecting an urgency of an alert and generating text for the alert taking into account the urgency of the alert, wherein selecting the urgency of the alert incorporates a measure of the time it has taken the participant to respond to changes in the topic or the context of similar electronic conversations in the past and a measure of the elapsed time since the participant last responded to the electronic conversation.

One or more embodiments of the invention, or elements thereof, can be implemented in the form of an apparatus including a memory embodying computer executable instructions and at least one processor that is coupled to the memory and operative by the computer executable instructions to perform exemplary method steps, or in the form of a non-transitory computer readable medium embodying computer executable instructions that when executed by a computer cause the computer to perform exemplary method steps.

Figure 5:
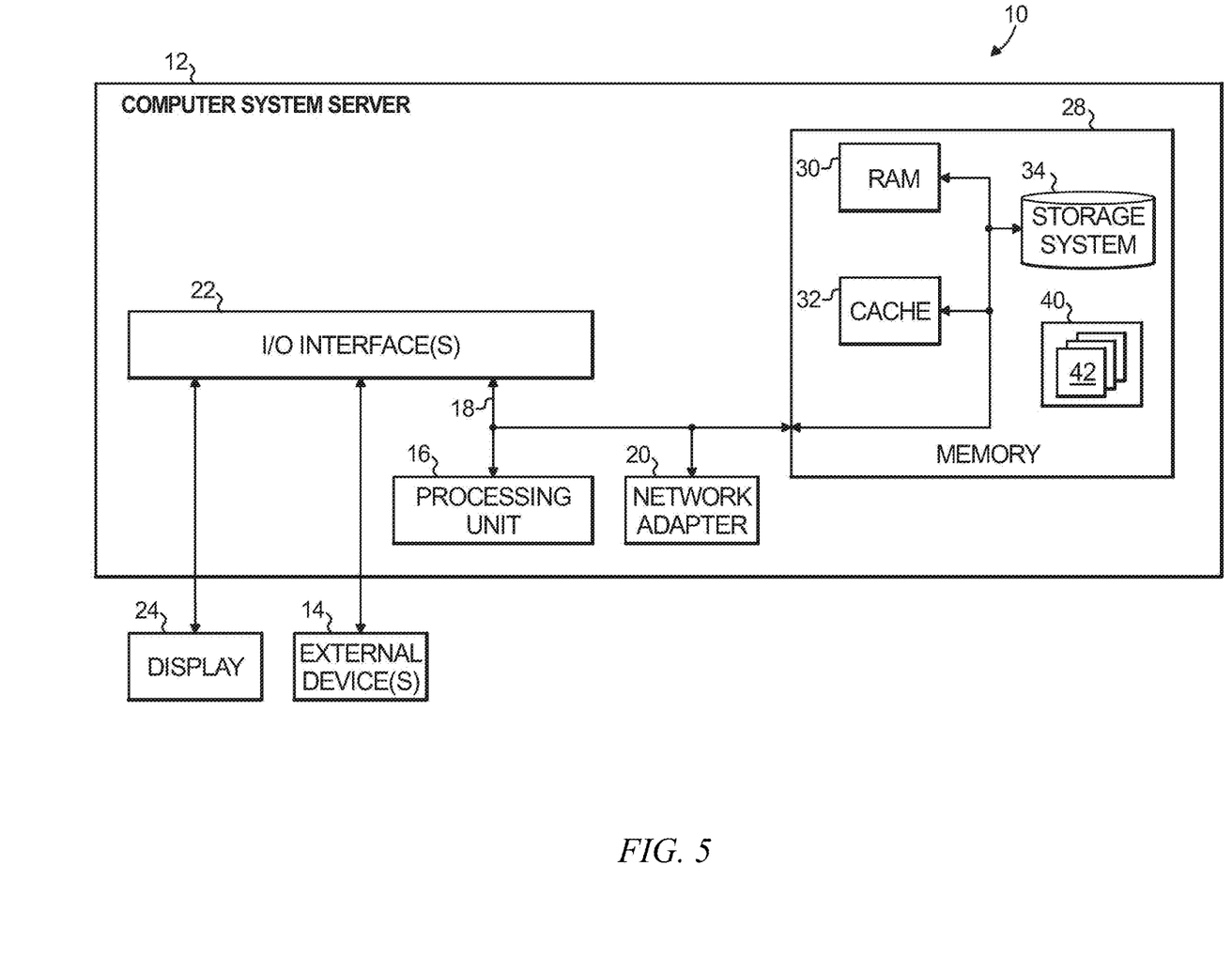
FIG. 5 depicts a computer system that may be useful in implementing one or more aspects and/or elements of the invention, also representative of a cloud computing node according to an embodiment of the present invention.

FIG. 5 depicts a computer system that may be useful in implementing one or more aspects and/or elements of the invention, also representative of a cloud computing node according to an embodiment of the present invention. Referring now to FIG. 5, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 5, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 5) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   tracking a topic and a context of an electronic conversation in a first communication channel by using a machine learning method to process the electronic conversation;
   identifying a confusion in a participant of the electronic conversation regarding a change in the topic or the context;
   identifying, by tracking the participant's activity across a multi-vendor spectrum of communication channels, a user-effective communication channel for alerting the participant to the change in the topic or the context; and
   alerting the participant of the change in the topic or the context via the user-effective communication channel.

2. The method of claim 1 further comprising learning an effective position or coordinate on a graphical user interface to display a notification for alerting the participant.

3. The method of claim 2 wherein the learning the effective position or coordinate includes detecting the participant's focus of attention on the graphical user interface.

4. The method of claim 3 further comprising updating a model of participant attentiveness based on text analytics of information displayed at the participant's current focus of attention.

5. The method of claim 1 wherein identifying the confusion includes using the machine learning method to process the participant's contributions to the electronic conversation.

6. The method of claim 5 wherein identifying the confusion includes using the machine learning method to measure an elapsed time since the change in the topic or the context.

7. The method of claim 5 wherein identifying the confusion includes using the machine learning method to count a number of communications, relevant to the change in the topic or the context, that have not been answered by the participant.

8. The method of claim 1 wherein alerting the participant includes propagating to the participant a summary of the change in the topic or the context via a communication channel in which the participant is currently active.

9. The method of claim 1 wherein alerting the participant includes propagating to the participant a summary of the change in the topic or the context via a communication channel in which the participant is most often active.

10. The method of claim 1 wherein alerting the participant includes at least one of: triggering a message pop-up, scrolling text on the participant's current device, encircling a statement indicating the change in the topic or the context, moving a mouse pointer to indicate the change in the topic or the context, generating a voice message, or activating the participant's digital assistant.

11. The method of claim 1 wherein alerting the participant includes selecting an urgency of an alert and generating text for the alert taking into account the urgency of the alert, wherein selecting the urgency of the alert incorporates a measure of the time it has taken the participant to respond to changes in the topic or the context of similar electronic conversations in the past and a measure of the elapsed time since the participant last responded to the electronic conversation.

12. A non-transitory computer readable medium embodying computer executable instructions that when executed by a computer cause the computer to facilitate the method of:
   tracking a topic and a context of an electronic conversation in a first communication channel by using a machine learning method to process the electronic conversation;
   identifying a confusion in a participant of the electronic conversation regarding a change in the topic or the context;
   identifying, by tracking the participant's activity across a multi-vendor spectrum of communication channels, a user-effective communication channel for alerting the participant to the change in the topic or the context; and
   alerting the participant of the change in the topic or the context via the user-effective communication channel.

13. The medium of claim 12 wherein the method further comprises learning an effective position or coordinate on a graphical user interface to display a notification for alerting the participant.

14. The medium of claim 13 wherein the learning the effective position or coordinate includes detecting the participant's focus of attention on the graphical user interface.

15. The medium of claim 14 wherein the method further comprises updating a model of participant attentiveness based on text analytics of information displayed at the participant's current focus of attention.

16. An apparatus comprising:
   a memory embodying computer executable instructions; and
   at least one processor, coupled to the memory, and operative by the computer executable instructions to facilitate a method of:
   tracking a topic and a context of an electronic conversation in a first communication channel by using a machine learning method to process the electronic conversation;
   identifying a confusion in a participant of the electronic conversation regarding a change in the topic or the context;
   identifying, by tracking the participant's activity across a multi-vendor spectrum of communication channels, a user-effective communication channel for alerting the participant to the change in the topic or the context; and
   alerting the participant of the change in the topic or the context via the user-effective communication channel.

17. The apparatus of claim 16 wherein the method further comprises learning an effective position or coordinate on a graphical user interface to display a notification for alerting the participant.

18. The apparatus of claim 17 wherein the learning the effective position or coordinate includes detecting the participant's focus of attention on the graphical user interface.

19. The apparatus of claim 16 wherein the method further comprises updating a model of participant attentiveness based on text analytics of information displayed at the participant's current focus of attention.

* * * * *